(12) United States Patent
Ritland et al.

(10) Patent No.: US 6,742,313 B2
(45) Date of Patent: Jun. 1, 2004

(54) NON-CELLULAR ADHESIVE FOR COMPOSITE ROOF STRUCTURE

(75) Inventors: Norm Ritland, Mauston, WI (US); Paul Scheafbauer, West Bend, WI (US); William Shackelford, Brier, WA (US)

(73) Assignee: R.S. Associates, Inc., West Bend, WI (US)

( * ) Notice: Subject to any disclaimer, the term of this patent is extended or adjusted under 35 U.S.C. 154(b) by 110 days.

(21) Appl. No.: 09/808,110

(22) Filed: Mar. 15, 2001

(65) Prior Publication Data

US 2002/0170254 A1 Nov. 21, 2002

Related U.S. Application Data

(60) Provisional application No. 60/264,066, filed on Jan. 1, 2001.

(51) Int. Cl.[7] .................................................. E04B 7/00
(52) U.S. Cl. ................... 52/408; 52/741.4; 52/746.1; 52/309.8; 528/66; 428/141
(58) Field of Search ............................ 52/408, 741.4, 52/746.1, 309.1, 309.8; 528/66; 428/141

(56) References Cited

U.S. PATENT DOCUMENTS

| | | |
|---|---|---|
| 1,152,860 A | 9/1915 | Stoetzer |
| 4,078,348 A | 3/1978 | Rothman |
| 4,141,187 A * | 2/1979 | Graves ........................ 219/213 |
| 4,421,581 A | 12/1983 | Olsen |
| 4,581,092 A * | 4/1986 | Westley .................... 156/309.6 |
| 4,693,923 A | 9/1987 | McGroarty et al. |
| 4,707,961 A | 11/1987 | Nunley et al. |
| 4,747,247 A | 5/1988 | Petersen, Jr. et al. |
| 4,841,705 A | 6/1989 | Fuhrer |
| 4,882,888 A | 11/1989 | Moore |
| 4,885,887 A | 12/1989 | Simmons et al. |
| 4,996,812 A | 3/1991 | Venable |
| 5,061,776 A * | 10/1991 | Weaver et al. ............... 156/330 |
| 5,232,531 A * | 8/1993 | Dammann et al. ........... 156/157 |
| 5,253,461 A * | 10/1993 | Janoski et al. ................ 156/71 |
| 5,421,876 A * | 6/1995 | Janoski ....................... 106/269 |
| 5,540,022 A | 7/1996 | Morris |
| 5,737,897 A | 4/1998 | Naipawer, III |
| 5,852,103 A * | 12/1998 | Bhat ........................... 524/445 |
| 5,872,203 A * | 2/1999 | Wen et al. ................ 428/423.1 |
| 5,951,796 A * | 9/1999 | Murray ......................... 156/78 |
| 6,130,268 A * | 10/2000 | Murray ........................ 521/131 |

FOREIGN PATENT DOCUMENTS

| | | | | |
|---|---|---|---|---|
| WO | WO 95/29945 | * | 11/1995 | ........... C08G/18/61 |

* cited by examiner

*Primary Examiner*—Brian E. Glessner
(74) *Attorney, Agent, or Firm*—Liniak, Berenato & White, LLC

(57) ABSTRACT

A composite roof structure, and a corresponding method of fabricating the structure, are disclosed which includes use of a layer of non-cellular adhesive material (preferably a two-component non-cellular polyurea polyurethane adhesive material), roof insulation panels, along with a flexible roof membrane, preferably made of thermoplastic olefin rubber, including a rubber-like sheet having a fleece-like matting secured to the underside thereof. The non-cellular adhesive is preferably sprayed onto a roof substrate and prior to complete solidification thereof the roof membrane or roof insulation is pressed into the adhesive so that the matting becomes embedded therein.

37 Claims, 1 Drawing Sheet

Fig. 3

NON-CELLULAR ADHESIVE FOR COMPOSITE ROOF STRUCTURE

Applicant hereby claims priority under 35 U.S.C. §119 (e) to provisional Application Serial No. 60/264,066, filed Jan. 1, 2001, the disclosed of which is incorporated herein by reference.

BACKGROUND OF THE INVENTION

1. Field of the Invention

The present invention relates generally to roof constructions, and more particularly to a composite roof structure and a corresponding method for fabricating the composite roof structure, using a non-cellular adhesive material for securing the roof insulation to the roof substrate and an upper, flexible roof membrane comprising a sheet of flexible rubber-like material preferably with fleece-like matting secured to the underside thereof or membrane with an underside prepared for adhesive attachment, to a roof substrate or roof insulation.

2. Description of the Prior Art

Many different roofing systems have been proposed in the past, ranging from simple asphalt/gravel roofs to more sophisticated structures making use of synthetic resin materials. It has also been known in the past to construct roofs using foamed, cellular adhesive materials, such as foamed, cellular polyurethane adhesives. However, they present a number of problems. First, the foamed, cellular synthetic resin adhesive materials tend to rise and forms bulges under the roof insulation or at roof membrane seam areas, thus making difficult and laborious to control evenness of the finished roof. They provide little resistance to low temperatures and become friable when are applied at temperature below 40° F. Furthermore, the foamed, cellular synthetic resin adhesive materials have relatively low tensile strength, thus provide very low puncture resistance to the finished Roof. The foamed, cellular adhesives have limited shelf life.

It has also been known in the past to construct roofs using synthetic rubber membranes formed from EPDM rubber. In such constructions, an adhesive substance is first applied to a substrate and allowed to partially dry. This drying causes volatile gases which are mostly pollutants, to escape into the atmosphere. Even at best, These roof membranes tend to be poorly attached and many times suffer from damage in usually encountered moderate winds.

SUMMARY OF THE INVENTION

The present invention overcomes the problems outlined above and provides a greatly improved composite roof structure broadly including a layer of non-cellular adhesive material adapted to be secured to a substrate, and various insulation layers adhered with the same non-cellular adhesive along with a flexible roof membrane attached to the adhesive. The roof membrane includes a sheet of flexible material (e.g. TPO rubber) having a fleece-like matting secured to the underside thereof or other prepared underside thereof. It has been found that the use of such matting permits the roof membrane to be strongly adhered to the adhesive, with the matting being at least partially embedded within the adhesive itself.

In particularly preferred forms, the non-cellular adhesive material is in the form of a non-cellular polyurea polyurethane adhesive material. The non-cellular adhesive layer has a thickness after solidification of at least about 1/16 inch, and more preferably from about 1/16 to 1/4 inches. Furthermore, in order to facilitate installation, the non-cellular adhesive material is initially in the form of a liquid and has a fast initial set and relatively slow subsequent final cure. Advantageously, the non-cellular polyurea polyurethane adhesive is a two-component system having polyol/diisocyanate components.

The flexible roof membrane preferably comprises a synthetic rubber (such as TPO, EPDM or the like) sheet having a thickness of from about 40–70 mils, with fleece-like non-woven polyester matting having a thickness from about 40–80 mils secured thereto or membrane with an underside prepared for adhesive attachment. While the TPO/polyester membrane is preferred, the invention is not so limited. Rather, use can be made of a wide variety of thermoplastic or thermosetting elastomeric flexible materials having a selected textile matting (e.g. polyolefinic) secured to the underside thereof or membrane with an underside prepared for adhesive attachment.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiments of the present invention will now be described with the reference to accompanying drawings. Typically, the roofs hereof are applied to an otherwise conventional roof substrate 10 which may include metal decking 12 and a layer of insulated foam 14. In preparing the substrate, the upper surface thereof should be clean, smooth, dry and free of grease, any sharp edges, fins, loose and foreign materials. The temperature of the roof substrate 10 should be 20° F. or above. Although a metal/insulated foam substrate has been illustrated, it will be appreciated that the invention is not so limited. Thus, the composite roof can be directly applied to plywood, chipboard, concrete, or smooth-surfaced built up roofs. The insulation used should be compatible with the adhesive system employed.

If the substrate is in the form of a ferrous metallic deck, such should be primed with an appropriate metallic primer. If a non-ferrous deck forms the substrate, it should be treated with a wash primer. Substrates of chromate-treated galvanized material should be brush blasted in accordance with SSPC-SP7-63T or acid etched and neutralized before priming. Concrete and/or masonry roof substrates should have a minimum cure of 28 days at 70 degrees F. and 50% relative humidity. All such surfaces should be clean, dry, and free of all dust, dirt, grease and oil prior to priming. Where necessary, concrete and/or masonry surfaces should be brush blasted to the texture of medium grade sandpaper or acid etched with a 10% hydrochloric acid solution and neutralized prior to priming. Where necessary, the concrete and/or masonry surfaces should be primed with conventional masonry primer. In the case of existing built up gravel roofs, the roofs should be power broomed in separate perpendicular passes to remove all loose gravel and, where necessary, power vacuumed. All blistered and delaminated or damaged areas should be removed and insulated foam applied until flush and smooth with the surrounding roof. All loose felts and flashings should be mechanically fastened and/or removed.

Figure 1:
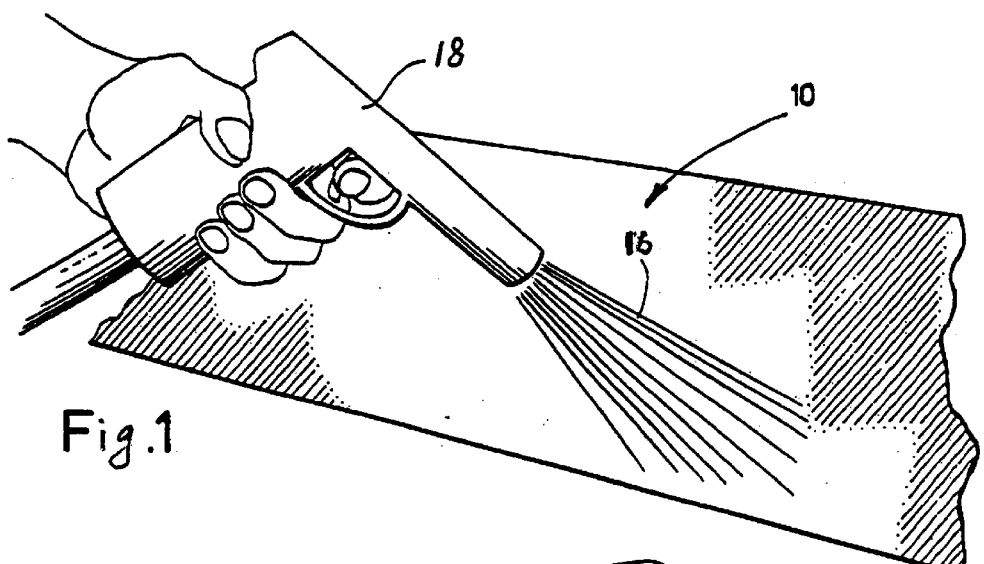
FIG. 1 is a schematic view illustrating the application of a non-cellular adhesive material to a roof substrate in the fabrication of a composite roof structure in accordance with the present invention.

After the substrate is prepared, a layer of a non-cellular adhesive material 16 in liquid form is applied. In accordance with the preferred embodiment of the present invention, a two-component non-cellular polyurea urethane adhesive material is used, that includes a mixture of component A, preferably diisocyanate, and component B, preferably polyol. Referring to FIG. 1, it will be seen that use is made of a conventional two-component spray gun apparatus 18 for this purpose. Where the preferred two-component non-cellular Polyurea polyurethane adhesive material is used, the polyol and diisocyanate components are mixed within a body of the spray gun apparatus 18 and sprayed onto the substrate 10 as illustrated. The temperature of the 1 ambient air or substrate should be 20° F. or above. The non-cellular adhesive material 16 is applied so as to obtain a final thickness, after complete solidification thereof, of about 1/16–1/8 inch.

Shortly after the application of the non-cellular polyurea polyurethane adhesive material 16 (as it becomes partially cured), a roof membrane 20 is placed in contact with the adhesive material 16. It is important that the roof membrane 20 is applied prior to complete set up and solidification of the adhesive material 16. Where the roof membrane 20 is supplied in a roll form, it can simply be unrolled behind the spray gun apparatus 18.

The roof membrane 20 includes an upper flexible rubber sheet 22 having a thickness of about 40–70 mils, and a non-woven polyester fleece-like layer 24 secured to the underside of the rubber sheet 22. Preferably, the flexible rubber sheet 22 is made of thermoplastic olefin (TPO) rubber. Alternatively, the flexible rubber sheet 22 may be made of other appropriate materials, such as ethylene propylene diene monomer (EPDM) rubber. It should be noted, however, that TPO rubber membranes are stronger and more durable than EPDM rubber membranes. Moreover, the TPO rubber membranes are preferred because their membrane seams may be welded and welded seams are stronger than glued seams. The fleece-like non-woven polyester matting preferably has a thickness of about 40–80 mils but may be substituted for any roof membrane bottom surface that has been prepared to receive an adhesive.

After the roof insulation or roof membrane 20 is unrolled and positioned on the substrate, it is pressed into the adhesive layer by means of a roller weighing approximately 100–150 lb to insure insulation contact or embedment of the fleece-like layer 24. At roof penetrations, the roof membrane 20 is cut as close as possible to the base of the penetration (in the case of pipes) or "X" cut to allow membrane to turn up onto base flashings.

Figure 2:
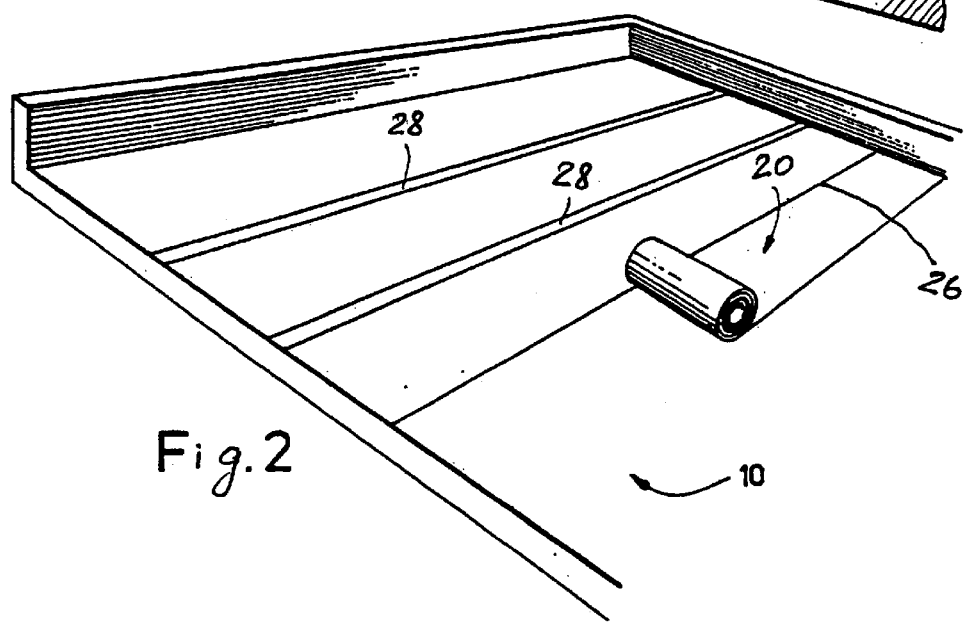
FIG. 2 is a perspective view of the application of a flexible membrane over a layer of the non-cellular adhesive material.
Figure 3:
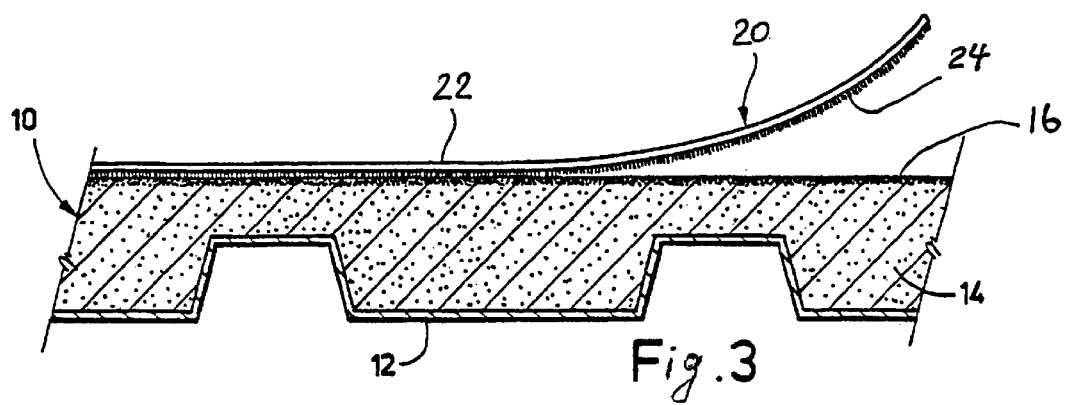
FIG. 3 is an enlarged vertical sectional view illustrating the composite roof structure.

As illustrated in FIG. 2, the roof membrane 20 is applied in side by side strips and thus presents, between respective strips, seam areas 26. In order to complete the roof structure, the seam areas 26 of the TPO rubber membranes 20 are welded. Alternatively, when the membranes 20 are made of EPDM rubber, a relatively narrow (e.g., 6 inch) seaming tape 28 in the form of extruded black rubber tape is employed, which is factory laminated to the cured EPDM rubber membrane. The tape 28 is soft and tacky and is covered with a release liner. The seaming material is applied to clean, dry membrane sheets, which are aligned with butted edges, as illustrated in FIG. 2. The seaming material is then centered over the butt joint, making sure there are no bridging areas or wrinkles. The release paper is then stripped from the tape, and light hand pressure is applied to assure adherence to the underlying membranes. The seam is then rolled with a small steel roller (3–4 inches wide) with about 5 pounds per linear inch pressure, 3 passes minimum. Finally, the edges of the applied seaming tape 28 are sealed with a lap sealant in the form of a high-grade roof membrane caulk. Finishing details around guttering, snap-on edges or the like are then completed, using conventional techniques.

As was disclosed hereinabove, the preferred adhesive material 16 is the non-cellular two component polyurea urethane system designed for bonding the roof membranes 20 to various acceptable substrates, such as Fiberboard, Polyiso, EPS, SPF, Dens Deck, Type X Gypsum, OSB, etc. Compatible deck types include concrete, cellular LWC, gypsum, cementitious wood fiber, wood and painted or galvanized steel. The non-cellular two component polyurea polyurethane adhesive material of the present invention is also compatible with the following roofing materials: smooth BUR, smooth or granulated Mod-Bit and a coal tar pitch.

The diisocyanate (component A) and polyol (component B) components are mixed in the spray gun apparatus 18 in an approximately 1:1 volumetric ratio. The final adhesive, when solidified, has a density of approximately 67.0 pounds per cubic foot. The polyol component consists primarily of a conventional polyol along with surfactants and catalytic agents. One preferred polyol component includes approximately 75% by weight Castor oil, 15% by weight polypropylene glycol, 6% by weight diethyl toluene diamine, 3% by weight ethylene glycol, and 1% by weight desiccant with trace quantities of catalyst. The preferred diisocyanate component consists of approximately 51% by weight 4,4'-methylene diphenyl isocyanate (MDI), 31% by weight polypropylene glycol, 7% by weight chlorinated paraffin, and 11% by weight trichloropropyl phosphate. The aforementioned two adhesive components are obtained from Volatile Free, Inc. of Waukesha, Wis., and have the following properties and characteristics:

TABLE

| Properties | Component A | Component B |
| --- | --- | --- |
| Base | Isocyanate Polymer | Polyols, Surfactants and Catalysts |
| Mixing Ratios by Volume | 1:1 part A to part B | |
| Viscosity (CPS@25° C.) | 750 | 640 |
| Average Net Weight, lbs | 525 | 438 |
| Packaging | 55 gal. Drum | 55 gal. Drum |
| Shelf Life, years | 1 | 1 |

The above disclosed two component non-cellular polyurea polyurethane adhesive material has a high tensile strength in the range of 1600 psi (as opposed to relatively low the tensile strength of the cellular polyurethane adhesive material in the range of 75 psi), and provides the desired properties for application in roof construction, such as low viscosity for ease of application, fast initial cure to provide a sufficient level of bonding the membrane 18 to the roof substrate 10 so that membranes 18 will stay in place, and slow final cure to ensure that workmen have enough time to apply all membranes to the roof substrate. These properties are achieved in part by adding a fast reacting amine to the adhesive material for providing quick initial set, and the slow curing polyol for providing extended final set time. As was disclosed hereinabove, the preferred adhesive material includes diethyl toluene diamine. However, the use of other amines, such as isophorone diamine, Ethacure 300, Unilink 4100, Unilink 4200, and Clearlink 1000, is also within the scope of the present invention. The level of any amine used is such that partial initial cure is achieved quickly.

Preferably, the adhesive material has an initial solidification time from about 30 seconds to 5 minutes. The final cure to a solid state is delayed for 10 minutes or more.

While a two-component non-cellular polyurea urethane adhesive material is preferable, the invention is not so limited. The use can also be made of other non-cellular adhesive materials, such as a single component non-cellular polyurea polyurethane adhesive material, if desired.

Therefore, the composite roof structure and method for forming thereof in accordance with the present invention provides many advantages in comparison with the prior art.

First, the non-cellular adhesive material 16 of the present invention provides stronger bond between the membranes 20 and the roof substrate 10 than foamed, cellular adhesives, because it more thoroughly saturates the polyester backing 24 on the membrane 20. Thus, superior wind uplift capability is ensured.

Secondly, the non-cellular adhesive material 16 of the present invention provides higher tensile strength than foamed, cellular adhesives. For instance, the above disclosed preferred two component non-cellular polyurea polyurethane adhesive material has a high tensile strength in the range of 1600 psi compared to the tensile strength of the cellular polyurethane adhesive material in the range of 75 psi. Thus, both the bond strength and a puncture resistance of the roof structure as a whole are substantially improved.

The non-cellular adhesive material of the present invention is resistant to low temperatures. It may be applied at temperatures up to about 20° F., whereas the slow rise cellular urethane adhesive cut off is 40° F. Thus, roofing season may be extended. Moreover, unlike the non-cellular adhesive material, the slow rise cellular urethane adhesive becomes friable (crystallizes) when it is applied at temperature below 40° F., and is destroyed when walked on.

Furthermore, the non-cellular adhesive material does not rise that makes it easier to control an evenness of the finished roof structure. The composite roof structure of the present invention has no bulges at the membrane seam areas where additional material is applied to prevent stress on membrane seams. The even application of the adhesive material to the roof substrate reduces the labor required and time spent on the membrane seams and other details. Moreover, with the present invention, the coverage rate of the roof membranes with the pre-applied fleece backing is approximately from 7,500 to 10,000 square feet of roofing, which is substantially higher than the rate of conventional systems. Accordingly, overall costs are reduced, and aesthetic appearance of the finished roof structure is improved.

Finally, the non-cellular adhesive material of the present invention provides better fire resistance, is less toxic and environmentally harmful, and has longer shelf life (1 year compared to 6 months for foaming adhesives).

The foregoing description of the preferred embodiments of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A composite roof structure adapted to be supported by a roof substrate and comprising:
    a layer of non-cellular solvent-free, initially low viscosity sprayable adhesive material adapted to be secured to said substrate, said adhesive material having an initial solidification time of about 5 minutes or less; and
    a flexible membrane including a sheet of flexible material having fleece-like matting secured to the underside thereof, said membrane being attached to said adhesive material with at least a portion of said matting being imbedded within the adhesive material.

2. The composite roof structure as defined in claim 1, said adhesive material is non-foamed, non-cellular synthetic resin adhesive material.

3. The composite roof structure as defined in claim 2, said adhesive material is non-cellular two component synthetic resin adhesive material.

4. The composite roof structure as defined in claim 2, said adhesive material is non-cellular polyurea polyurethane adhesive material.

5. The composite roof structure as defined in claim 3, said adhesive material is non-cellular two component polyurea urethane adhesive material.

6. The composite roof structure as defined in claim 5, said non-cellular two component polyurea polyurethane adhesive material including polyol and a diisocyanate components.

7. The composite roof structure as defined in claim 2, said layer having a thickness of at least about 1/16 inch.

8. The composite roof structure as defined in claim 7, said thickness being from about 1/16 inch to 1/4 inch.

9. The composite roof structure as defined in claim 1, said adhesive material being initially in the form of a liquid and having an initial solidification time from about 30 seconds to 5 minutes.

10. The composite roof structure as defined in claim 1, said sheet of flexible material comprising a synthetic rubber.

11. The composite roof structure as defined in claim 10, said synthetic rubber being thermoplastic olefin rubber.

12. The composite roof structure as defined in claim 10, said synthetic rubber being ethylene propylene diene monomer rubber.

13. The composite roof structure as defined in claim 10, said synthetic rubber sheet having a thickness of about 40 mils to 70 mils.

14. The composite roof structure as defined in claim 1, wherein said fleece-like matting comprising polyester matting.

15. The composite roof structure as defined in claim 14, said polyester matting having a thickness of about 40–80 mils or membrane with an underside prepared for adhesive attachment.

16. A method for forming a composite roof structure upon a roof substrate, said composite roof structure comprising a flexible roof membrane including a flexible sheet having a fleece-like matting secured to the underside thereof, said method comprising the steps of:
- providing a solvent-free, initially low viscosity sprayable non-cellular adhesive material having an initial solidification time of about 5 minutes or less;
- spraying a layer of said solvent-free, initially low viscosity sprayable non-cellular adhesive material onto said substrate;
- after said adhesive material is sprayed, applying said flexible roof membrane thereto by placing said fleece-like matting in contact with said layer of said adhesive material prior to complete solidification thereof causing said matting to become at least partially embedded within the adhesive material; and
- allowing the adhesive material to solidify.

17. The method as defined in claim 16, wherein said adhesive material is non-foamed, non-cellular synthetic resin material.

18. The method as defined in claim 17, wherein said adhesive material is two component non-cellular synthetic resin adhesive material.

19. The method as defined in claim 17, wherein said adhesive material is non-cellular polyurea polyurethane adhesive material.

20. The method as defined in claim 18, wherein said adhesive material is non-cellular two component polyurea urethane adhesive material.

21. The method as defined in claim 20, wherein said non-cellular two component polyurea urethane adhesive material including polyol and a diisocyanate components.

22. The method as defined in claim 18, wherein said layer having a thickness of at least about 1/16 inch.

23. The method as defined in claim 22, wherein said thickness being from about 1/16 inches to 1/4 inches.

24. The method as defined in claim 16, wherein said non-cellular adhesive material being initially in the form of a liquid and having an initial solidification time of from about 30 seconds to 5 minutes.

25. The method as defined in claim 16, wherein said flexible sheet comprising a synthetic rubber.

26. The method as defined in claim 25, wherein said synthetic rubber being thermoplastic olefin rubber.

27. The method as defined in claim 25, wherein said synthetic rubber being ethylene propylene diene monomer rubber.

28. The method as defined in claim 25, wherein said flexible sheet having a thickness from about 40 mils to 70 mils.

29. The method as defined in claim 16, wherein said fleece-like matting comprising polyester matting.

30. The method as defined in claim 29, said polyester matting having a thickness from about 40 mils to 80 mils or membrane with an underside prepared for adhesive attachment.

31. A composite roof structure adapted to be supported by a roof substrate and comprising:
- a layer of non-cellular solvent-free, initially low viscosity sprayable adhesive material adapted to be secured to said substrate, wherein said adhesive material is non-foamed, non-cellular synthetic resin adhesive material; and
- a flexible membrane including a sheet of flexible material having fleece-like matting secured to the underside thereof, said membrane being attached to said adhesive material with at least a portion of said matting being imbedded within the adhesive material.

32. The composite roof structure as defined in claim 31, said adhesive material is non-cellular two component synthetic resin adhesive material.

33. The composite roof structure as defined in claim 31, said adhesive material is non-cellular polyurea polyurethane adhesive material.

34. The composite roof structure as defined in claim 32, said adhesive material is non-cellular two component polyurea urethane adhesive material.

35. The composite roof structure as defined in claim 34, said non-cellular two component polyurea polyurethane adhesive material including polyol and a diisocyanate components.

36. The composite roof structure as defined in claim 31, said layer having a thickness of at least about 1/16 inch.

37. The composite roof structure as defined in claim 36, said thickness being from about 1/16 inch to 1/4 inch.

* * * * *